United States Patent
Duffield et al.

(10) Patent No.: US 7,295,281 B2
(45) Date of Patent: Nov. 13, 2007

(54) SYSTEM AND METHOD FOR ADAPTIVE MARKING AND CODING OF FILM PRINTS

(75) Inventors: David Jay Duffield, Indianapolis, IN (US); Ion Vizireanu, Westlake Village, CA (US); Mike Arthur Derrenberger, Hopkinton, MA (US); Yousef Wasef Nijim, Valencia, CA (US)

(73) Assignee: Thomson Licensing, Boulogne-Billancourt (FR)

( * ) Notice: Subject to any disclaimer, the term of this patent is extended or adjusted under 35 U.S.C. 154(b) by 0 days.

(21) Appl. No.: 11/439,859

(22) Filed: May 24, 2006

(65) Prior Publication Data

US 2006/0286489 A1    Dec. 21, 2006

Related U.S. Application Data

(60) Provisional application No. 60/691,818, filed on Jun. 17, 2005.

(51) Int. Cl.
    G03B 19/18    (2006.01)
    G03B 21/32    (2006.01)

(52) U.S. Cl. .......................................... 352/38; 352/85
(58) Field of Classification Search ................. 352/38, 352/85, 90; 713/176; 430/380
    See application file for complete search history.

(56) References Cited

U.S. PATENT DOCUMENTS 6,044,182 A * 3/2000 Daly et al. .................. 382/284
6,614,914 B1 * 9/2003 Rhoads et al. .............. 382/100
7,044,395 B1 * 5/2006 Davis et al. ................. 235/494
7,062,069 B2 * 6/2006 Rhoads ....................... 382/100
7,197,156 B1 * 3/2007 Levy .......................... 382/100
2005/0086480 A1 * 4/2005 Kerr et al. ................... 713/176

FOREIGN PATENT DOCUMENTS

WO    WO 2005/027500    3/2005

\* cited by examiner

*Primary Examiner*—Rodney Fuller
(74) *Attorney, Agent, or Firm*—Joseph J. Laks; Robert B. Levy; Jorge Tony Villabon

(57) ABSTRACT

A system and method for marking, coding and tracking a film print in an efficient, adaptive and customized manner for providing unique and robust identification of each individual film print and for facilitating accurate tracking of the origin of a pirated copy is described herein. A film print to be marked is calibrated and provided in computer-readable form for input to a prescreening device. The calibrated film print is reviewed and ideal locations on each frame of the film print are chosen for applying a mark. A unique coding scheme is generated for each desired print. If a pirate copy is found, all marks are located and a matching serial number (e.g., coding scheme) is determined for the pirated copy based on marks found in the pirate copy when compared to a database storing film print mark information generated during the marking and coding process.

20 Claims, 4 Drawing Sheets

SYSTEM AND METHOD FOR ADAPTIVE MARKING AND CODING OF FILM PRINTS

CROSS REFERENCE TO RELATED APPLICATIONS

This application claims the benefit of U.S. Provisional Patent Application Ser. No. 60/691,818, entitled "PRESCREENING AND ADAPTIVE MARKING FOR 35 mm DISTRIBUTION PRINTS", filed Jun. 17, 2005, which is incorporated by reference herein in its entirety.

TECHNICAL FIELD OF THE INVENTION

The present invention generally relates to film security, and more particularly, to a system and method for marking and identifying film prints for anti-piracy purposes.

BACKGROUND OF THE INVENTION

Piracy concerns in connection with the theatrical exhibition of motion picture films are well known. Once a film distributor distributes prints of a motion picture film to exhibitors for theatrical exhibition, often a certain degree of control over the product is lost. For example, in the regular course of exhibiting the film, a customer in the theater may surreptitiously record the film using, for example, a hand held camcorder. At a more sophisticated level, a person seeking to obtain an illegal copy of a film print may gain access to a theater projection booth in collusion with an employee of the exhibitor and make a copy of the film after hours in a relatively controlled environment. In such an environment, the audio from the projection equipment can be directly fed to the camcorder. A tripod can be used to ensure a clear and steady picture. As a result, an illicit copy of relatively high quality can be made. Alternatively, the print itself may be scanned to create a video master.

Such illicit "pirate" copies of a movie can now be distributed over the Internet or using hard copies (video CDs or DVDs), and this reduces the economic value of the legitimate film distribution. With the advent of the Internet and affordable higher quality recording devices, this problem has become increasingly severe in recent years. Thus, a method for tracing the chain of people who produce this damage is highly desirable.

In 1982, the Motion Picture Association of America (MPAA), together with the Kodak™ Corporation, developed a technology for uniquely identifying film prints. This technology is commonly known as Coded Anti-piracy (CAP) coding. The code is a series of faint dots in the picture that are added as the print is manufactured. Approximately one out of every hundred frames contains four tiny dots that have been added to the image. Generally, 11 CAP-coded frames are required to reconstitute the serial number of the movie print. Each unique configuration of dots corresponds to a print identifier. The film prints are usually coded for each particular theater in which a film is distributed.

Typically, in the past, aiming an analog camcorder at a theater screen produced a poor quality, flickering image, but the coding dots usually survived the copying and reproduction process so that the serial number of the movie print could be obtained. However, the advent of digital video compression and distribution technologies has diminished the viability of CAP coding. Improved digital camcorders not only take higher quality pictures, but video compression algorithms (which are commonly employed when the pirated film is stored in a digital format or transported over the Internet) tend to obliterate the CAP codes. Specifically, because the dots representing the code are extremely small and diffuse, they are susceptible to disintegration during video compression. Furthermore, the loss of a single CAP code dot during image compression can defeat the CAP coding scheme because the CAP code is represented by spatial image placement within the film frame. Indeed, CAP coding is dependent upon 100% image survival.

Another limitation of the CAP coding system is that a total of only 2023 unique configurations were developed in 1982. At that time, this was a sufficient number of configurations because it was roughly equivalent to the number of theaters in operation at the time and substantially exceeded the number of prints that had been made in connection with even the largest motion picture releases. However, today there are over 20,000 theaters worldwide, and major motion picture releases of more than 5,000 prints are increasingly common. Accordingly, in the CAP coding system there are an insufficient number of codes available to uniquely identify each film print that is being distributed.

Further, the frequency of code image repetition in CAP coding systems increases the likelihood that the public will see the image. This is undesirable as it can distract viewers from the film content or cause them to form an opinion that a particular theater shows poor quality prints.

Both Technicolor™ and Deluxe™ film laboratories have introduced newer systems that improve upon CAP coding. These systems place different patterns of dots in different frames of the film to be marked, and using these patterns encode a serial number for the print. However, in such systems the locations of the marks within a frame have either been uncontrolled or fixed.

Accordingly, there is a pressing need for a system and method that allows the origin of the piracy to be identified which avoids the limitations and deficiencies of CAP coding. Namely, an efficient and effective method for detecting and tracing unauthorized copying of a film print would be highly desirable.

SUMMARY OF THE INVENTION

The present invention provides a system and method for marking and providing a durable, robust and unique identification for a film print to facilitate the tracking of the origin of, e.g., a pirated film copy. The present invention enables the selection of locations, patterns and types of marks for marking a film print and providing a unique identifier for each marked film print that can be used for forensic purposes to identify the origin of a pirated film.

In one embodiment of the present invention, a method for marking and coding a film print, includes superimposing a computer-readable form of the film print with a graduated grid for accurately determining possible marking locations, determining optimal locations for applying at least one mark to at least one frame of the film print, the optimal locations for the at least one mark being selected from the determined possible marking locations, and uniquely coding the film print by selectively applying marks. Alternatively, the method can further include selectively and uniquely applying the marks to the film print during each replication of the film print such that each replication of the film print has a unique code.

In an alternate embodiment of the present invention, a system for marking and coding a film print includes a prescreening device configured to superimpose a computer-readable form of the film print with a graduated grid for accurately determining possible marking locations, a marking device configured to determine optimal locations for applying at least one mark to at least one frame of said film print, the optimal locations for said at least one mark being selected from the determined possible marking locations, and a coding device configured to uniquely code the film print by selectively applying marks and by using information regarding the selectively applied marks. Alternatively, the system can further include a storage device for storing determined unique codes and associated film marking information. Such stored information can be used at a later time for comparison with a suspected unauthorized copy of a film print to identify a source film print from which the suspected unauthorized film print copy was made. Even further a system for marking and coding a film print in accordance with the present invention can further include a scanning device for converting a film print to a computer-readable form.

BRIEF DESCRIPTION OF THE DRAWINGS

The teachings of the present invention can be readily understood by considering the following detailed description in conjunction with the accompanying drawings, in which.

Figure 1:
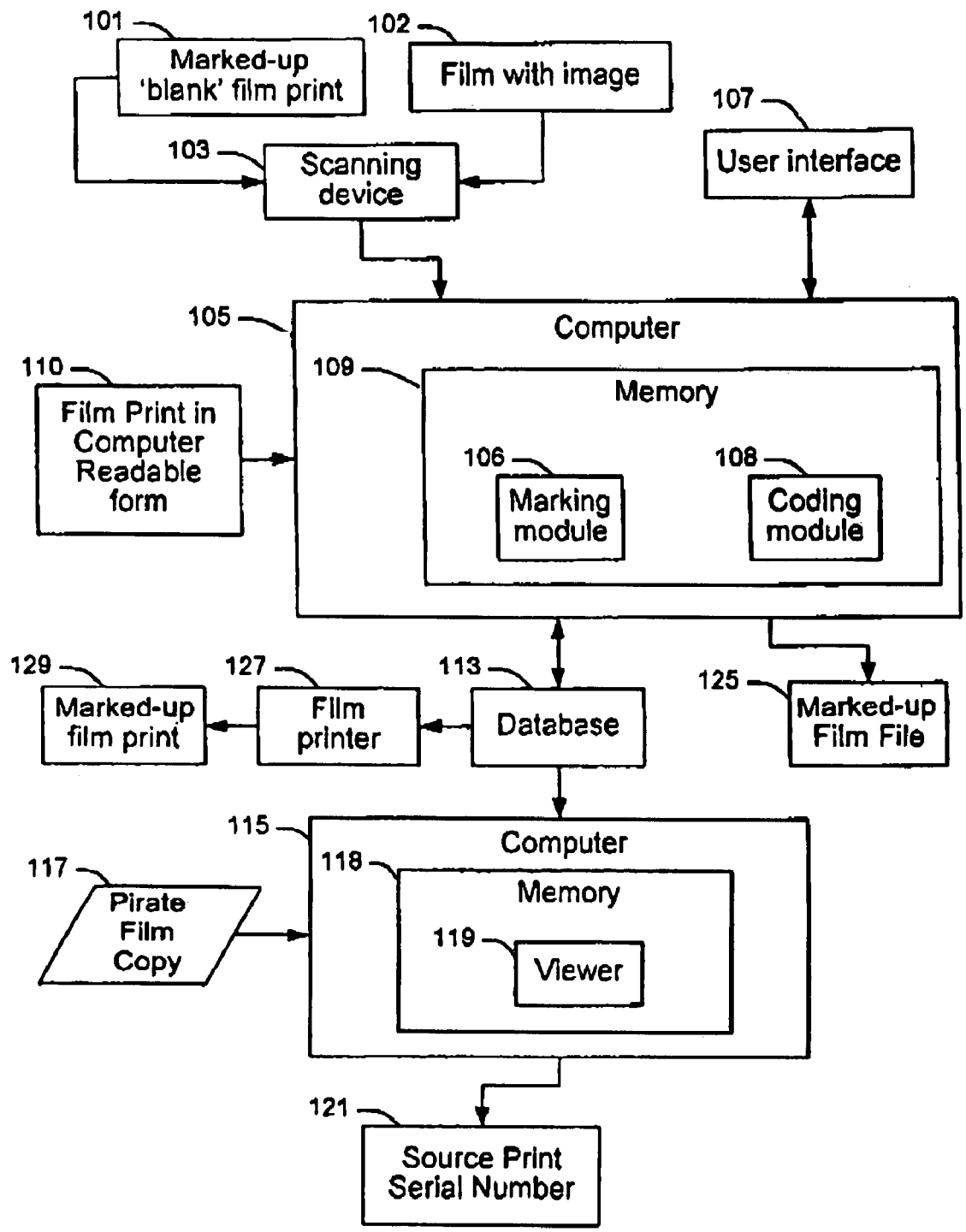
FIG. 1 depicts a high level block diagram of a film marking system in accordance with an embodiment of the present invention.

It should be understood that the drawings are for purposes of illustrating the concepts of the invention and are not necessarily the only possible configuration for illustrating the invention. To facilitate understanding, identical reference numerals have been used, where possible, to designate identical elements that are common to the figures.

DETAILED DESCRIPTION OF THE INVENTION

The present invention advantageously provides a system and method for marking and identifying film prints for, for example, anti-piracy purposes. Although the present invention will be described primarily within the context of a film marking system comprising specific components for scanning and marking films, the specific embodiments of the present invention should not be treated as limiting the scope of the invention. It will be appreciated by those skilled in the art and informed by the teachings of the present invention that the concepts of the present invention can be advantageously applied using various other configuration and components. That is, the following description illustrates the principles of the present invention. It will thus be appreciated that those skilled in the art will be able to devise various arrangements that, although not explicitly described or shown herein, embody the principles of the invention and are included within its spirit and scope.

Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that the elements and operations depicted in the accompanying figures can be implemented in various forms of hardware, software or combinations thereof. Preferably, these elements are implemented in a combination of hardware and software on one or more appropriately programmed general-purpose devices, which may include a processor, memory and input/output interfaces.

FIG. 1 depicts a high level block diagram of a film marking system in accordance with an embodiment of the present invention. In the film marking system of FIG. 1, a scanning device 103 is provided for scanning marked-up 'blank' film prints 101 (e.g., film prints with no images but marked-up with marks placed in all 'grid' locations, and preferably with lines of blank frames) as well as film prints with images 102 (e.g., a 'master' copy of a movie film print) for providing a computer-readable form of the film prints 101, 102. It should be noted that the term "film print" used throughout this description refers to a film print including an image, while the term "blank film print" refers to a film print with no image.

The scanning device 103 can comprise, for example, a telecine or any device that will generate a video output from film such as an Arri LocPro™ with video output. Alternatively, files from the post production process 110 (i.e., files already in computer-readable form) can be used directly. Potential sources of such computer-readable files are AVID™ editors, DPX files, D5 tapes and the like.

Scanned (computer-readable) film prints are input to a prescreening device 105 (e.g., illustratively a first computer) having a user interface 107 and memory 109. Alternatively, files/film prints already in computer-readable form 110 (i.e., stored on an external hard drive) can be directly input into the prescreening device 105. In one embodiment of the present invention, a software program, including a marking module 106 and a coding module 108 stored in the memory 109, processes the film prints. That is, in one embodiment of the present invention, the software program, marking module 106 and coding module 108, assist in analyzing as well as marking and coding each film print so that each print is uniquely identifiable in accordance with the present invention. A storage device 113 (e.g., illustratively a database) is provided for storing the particular codes and identification information for each processed film print. In addition, the database 113 can also preferably store reference images from the 'master' film print to provide a point of comparison to help facilitate identification and correction of any editing or modification caused by pirates when a pirate copy is received for forensic analysis. The database 113 can be externally provided on a server accessible via a network (e.g., Internet). The resultant output for, for example, distribution to theaters comprises a uniquely marked film file 125 from the prescreening device 105 and/or a marked-up film print 129 printed from a film printer 127 functionally connected to database 113. The database can further comprise information regarding to where each uniquely coded film print was delivered.

If a pirate copy of a film 117 is found, it can be input to a tracking device 115 (e.g., illustratively second computer) which also has access to the database 113. The tracking device 115 can include a memory 118 having a viewing module 119 for highlighting the mark locations used for a particular film for comparison with recovered pirate content.

The pirate copy 117 is analyzed via the viewing module 119 which attempts to match the pirate copy with film print identification information stored in the database 113 to track, for example, the origin/identity of the original legitimate film print ('source' print) from which the pirate copy 117 was illegally reproduced. The output can comprise a source print serial number 121 or code, which identifies a source film print.

While the film marking system of FIG. 1 depicts a scenario in which a computer 105 behaves as a prescreening device (i.e., for marking and coding a film) and a computer 115 is used as a viewer device (i.e., for determining a serial code from a pirate copy), such depiction is for exemplary purposes only. It should be noted that either the computer 105 or the computer 115 can include copies of any or all of the modules 106, 108 and/or 119, and thus any computer can function as either a prescreening device and/or a viewer device, depending on the modules loaded thereon.

Figure 2:
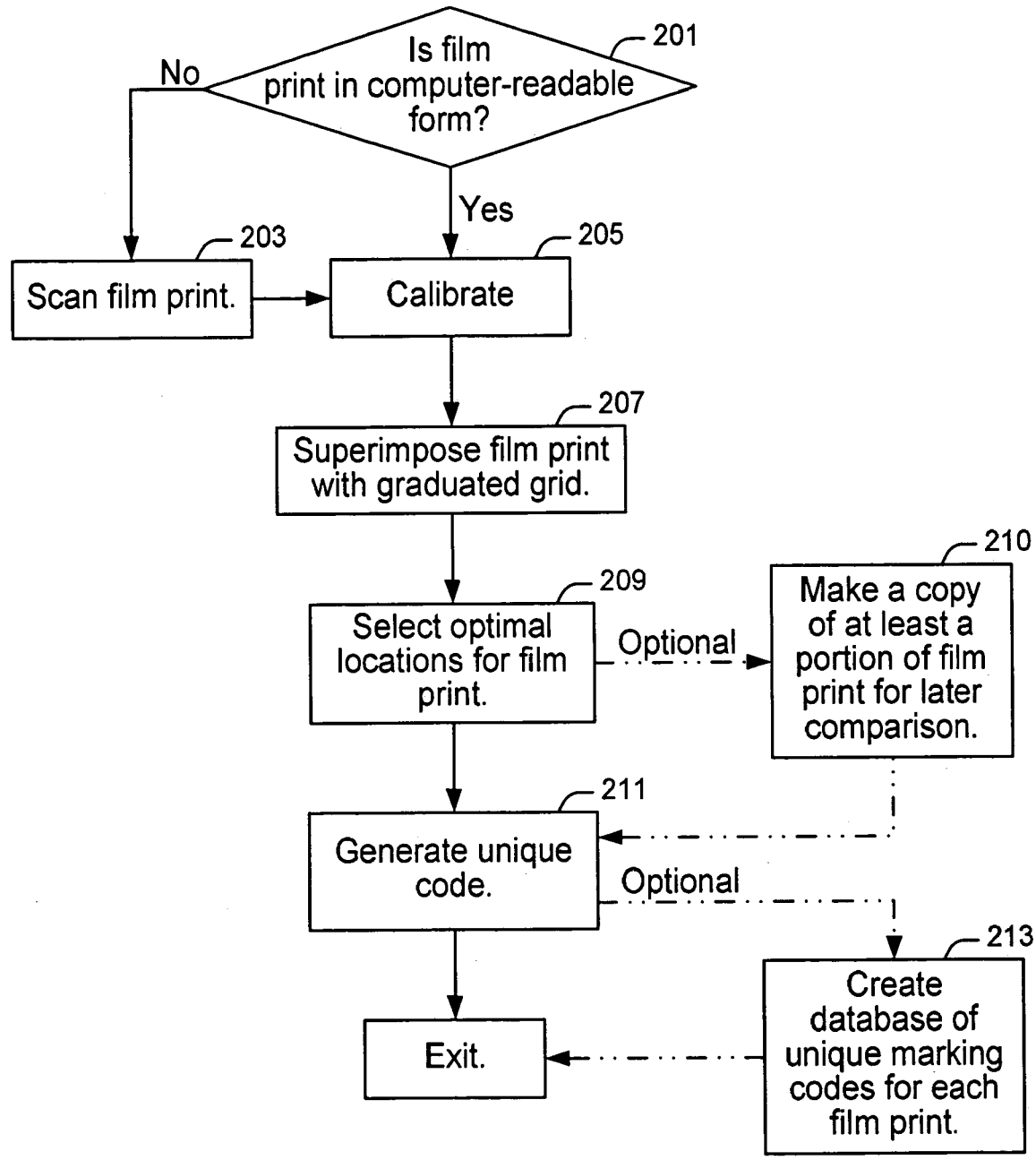
FIG. 2 depicts a flow diagram of a method for marking, coding and tracking a film element in accordance with an embodiment of the present invention.

FIG. 2 depicts a flow diagram of a method for marking and coding a film print in accordance with an embodiment of the present invention. The method of FIG. 2 begins at step 201, where it is determined whether the film print with images is in a computer-readable format. If the film print is not in computer-readable format, the method proceeds to step 203. If the film print is in computer-readable format, the method alternatively skips to step 205.

At step 203 and in accordance with one embodiment of the present invention, the film is scanned to convert the film print into computer-readable format. Although in step 203, a film is scanned to convert the film print to a computer-readable format, other methods or means known in the art can be used to convert a film into a computer readable format (e.g., digital format). The method then optionally proceeds to step 205.

More specifically, step 205 is an optional step. That is, at step 205 the film print is calibrated to a marking device. More specifically, according to an aspect of the present invention, at a time prior to the 'prescreening' ('custom' marking) process, the marking positions can be preferably calibrated with the film image such that the marking device and grid frame are synchronized with the framing of the film.

Figure 3:
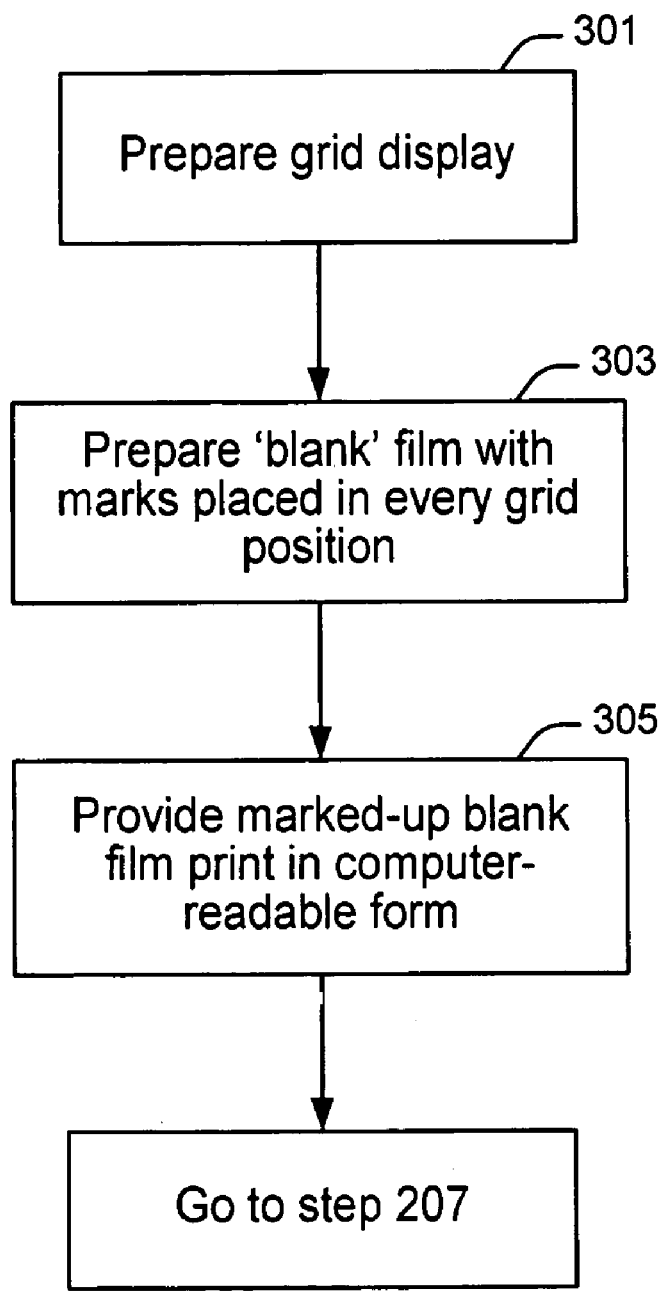
FIG. 3 depicts a flow diagram of a method for calibrating a film element in accordance with an embodiment of the present invention.
Figure 4:
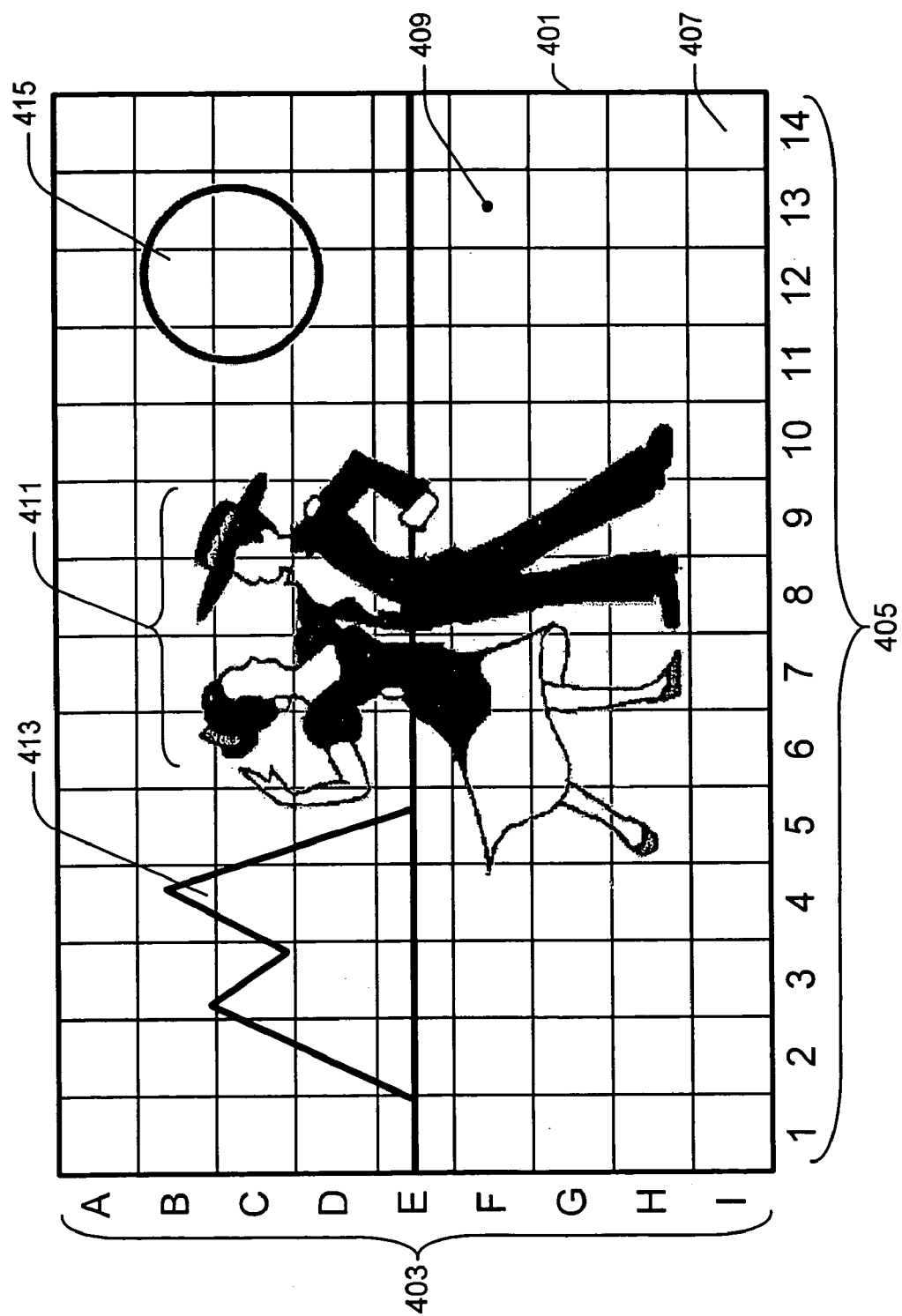
FIG. 4 depicts of a film image to be marked in accordance with the present invention, the film image depicted superimposed on a grid display.

For example, FIG. 3 depicts a flow diagram of a method for calibrating a film element with a marking grid in accordance with an embodiment of the present invention. The calibration method of FIG. 3 begins at step 301 in which a grid display is prepared. For example, FIG. 4 depicts a film image depicted superimposed on a grid display. In the example of FIG. 4, a rectangular grid 401 is provided including a plurality of labeled columns 405 and rows 403, which comprise a plurality of smaller grids 407 within which a mark may be placed. That is, for example, a grid can be provided having squares with identification axes, and a program can be provided that would allow a user to click on desired mark locations with a pointing device. The grid may preferentially have smaller grids or grid squares 407 that are at least larger than the actual marks to alleviate any imprecision in mark placement. This 'tolerance area' can be optimized to reflect the precision of the marking device, and can include different tolerances on different axes or at different locations. In one exemplary embodiment (not shown), the grid 401 can comprise 8 columns and 64 rows, for a total of 512 smaller grids per frame in which a mark may be placed.

Referring back to the method of FIG. 3, at step 303 a blank film calibration grid is generated. That is, in one embodiment of the present invention, a blank film with marks placed in every grid position is generated. The calibration grid can be superimposed/placed over a film print to compare at least the limits of the film print frames with the grid positions, such as the smaller grids 407 (referring back to FIG. 4) to for example calibrate the limits of the grid and the grid marks to the limits of the film print frames. For example, a device used to mark the film can be used to place a mark 409 (e.g., a dot 409) at all mark locations (i.e., a single dot 409 is placed in each of the smaller grids 407), and a calibrated depiction of potential mark locations (e.g., a marked-up 'blank' print 101) is thus created in step 303. The method for calibrating a film print to a marking device and grid then proceeds to step 305.

At step 305, the resultant calibrated grid of potential mark locations (e.g., the marked-up blank film print 101) is converted to a computer-usable format. The method for calibrating a film element of FIG. 3 is then exited and the method for marking and coding a film print of FIG. 2 proceeds to step 207.

At step 207, the computer-readable film prints are superimposed with the graduated grid for accurately determining possible marking locations. Useful information for selecting marking locations can include respective frame numbers or timing information and some indication of the available marking locations. In one embodiment of the present invention, a film print is superimposed over a grid, as depicted in FIG. 4, and the film print is examined for selecting grid locations, and as such, frame numbers and locations for marking. For example, the marked-up blank film print (e.g., the graduated grid) and the film print with image (both being in computer-readable format) are preferably superimposed one over the other. Advantageously, the exact position of the grid relative to the film print and images can be determined. Even further, the exact location of the mark in each grid of the 'blank' print relative to the images in the film print can be determined and recorded. The method then proceeds to step 209.

At step 209, optimal locations for the placement of marks in each frame can be selected. That is, using the methods described above, a precise mapping of a mark relative to an actual image (e.g., background, scenery, characters) can be determined, and the optimal locations for the placement of marks in each frame can be selected. Factors and criteria which can be considered to determine "optimal" or 'ideal' locations for the markings can include, for example, areas of frames which have minimal action or movement and/or areas of frames with minimal flesh tones such as actors' faces. In one embodiment of the present invention, the process of step 209 for selecting marking locations can be performed manually by a user. Alternatively and in alternate embodiments of the present invention, the selection of marking-locations can be performed automatically via software having a marking module 106 which can analyze the images and suggest potential marks for user approval and/or make automated decisions regarding which marks at what locations should be used according to, for example, a set of programmed conditions in which the marking module 106 constantly updates itself and 'learns' placement of ideal marking locations based on prior selections. Preferably, the marking module 106 further enables a user to view the image in both unmarked and marked-up versions. The marking module 106 may also depict the different colors, shapes, or sizes of marks that are available for selection and application. The method then proceeds to step 211.

Before proceeding to step 211, the method may optionally include step 210 as depicted in FIG. 2. At step 210, at least one scene from the film print is copied for comparison at a later time with, for example, pirate films during forensic analysis to assist the search for marks in the pirate copy (described below). The method then proceeds to step 211.

At step 211, a coding module 108 examines the eligible and suggested preferred locations for the marks and an input number of desired film prints (i.e., a user provides input via the user interface 107 regarding a number of film prints which are to be distributed) and generates a coding scheme that defines which mark locations will be used for each print number. That is, based on the number of film prints desired to be distributed, the coding module 108 creates a unique marking arrangement for each of the prints and assigns a unique 'serial number' for each. In one embodiment of the present invention, a serial number can comprise the print number itself (i.e., if 500 uniquely marked film prints are desired, each print can respectively be numbered 1-500).

For example in one embodiment of the present invention, the coding module 108 takes the chosen marking locations and 'codes' serial numbers using the available combinations, taking into account the number of individually identifiable film prints desired. Many such algorithms are possible which can be implemented. For example, patterns of marks can be used as an alphabet to create a multi-digit code. The existence or absence of a mark or pattern can be used to carry a binary bit of information, and/or the shape or duration of marks can be used to convey one of several values. For example, it is known in the art how to combine several alphabet characters with limited discrete values into a larger number to allow more serial numbers (i.e., similar to the way numerical digits are combined into a base-10 number). Preferably, the marking process of the present invention can further incorporate providing redundancy to the data. This redundancy allows for recovery of the proper serial number even if some of the marks are lost or modified. The output from the marking and coding modules 106, 108 is used during the film print replication process to place subtle marks on the film that will allow each copy to be individually identifiable. The marking and coding method of the present invention is then exited.

As depicted in FIG. 2, however, the method of FIG. 2 can optionally include step 213. That is, at step 213, once the desired marking selections are made and the code is generated, a file or message (e.g., a text file) identifying the various marking parameters as well as corresponding marking codes for a specific film print are stored in a database. Such parameters can include, frame numbers (or other similar indication of which image in a sequence to mark), the locations of the marks on a frame (i.e., the mark's coordinates), patterns or orientations of the marks, indications of color, size, or shape of markings, indications of the intensity desired for the mark, and the like. That is, film prints and print segments are not only identifiable by the locations of marks, but other factors such as size, shape, intensity, orientation, color of the marks and the like, can be used to code a film print or film print segment such that the film print or film print segments can be uniquely identified. The database can be accessible to a user to aid in identifying a specific print that may have been pirated (illegally copied).

After the marking and coding method of the present invention, the resultant marked-up film print and/or marked-up film file is created for distribution, for example, to theaters for display. Advantageously, the present invention efficiently enables the creation of large numbers of copies of a film print, each of which is individually identifiable via the unique marking and coding scheme of the present invention as described above. Furthermore, these marks are advantageously optimized in time and location such that a film print marked according to the present invention provides minimal impact to the film viewer while ensuring maximum likelihood of successful forensic analysis during evaluation of a pirated copy of such marked film.

For example, for tracking marked and coded film prints in accordance with the present invention, a computer can include a viewing module 119 that highlights the mark locations used for a particular film print for comparison with recovered pirated content. The viewer 119 can also be supplied with copies of original image(s) from the original film (retrieved from step 210.as described above) to assist in identifying and correcting for any editing or modification done by pirates in an effort to hinder identification of the film. Such a process aids, for example, a forensic analyst in finding marks in a pirate copy more quickly and reliably during analysis.

That is, when an illegitimate copy of a film (pirate copy) is found, a forensic analysis is performed (either manually or automated) for examining the pirate copy for any marks that were made during the film printing and coding process of the present invention. Data regarding identified marks in the pirated copy, such as location and type of marks, is gathered and provided to the viewing module. The viewing module determines a print serial number (e.g., code) from the identified marks in the pirate copy by comparing and matching the mark information of the pirated copy with database information regarding marks in original film prints and print segments.

Referring back to FIG. 4, an example of an image to be marked is superimposed on a grid layout 401. As described above, marks 409 can be placed such that the marks are in the most unobtrusive locations in the image scene, such as on the mountains 413 or sun 415, rather than on characters 411. Accordingly, any of the marking locations C3, C4, D2, D3, D4, D5, E2, E3, E4, E5, B12, B13, C12 and C13 might be chosen as the potential ideal locations for marks in the exemplary image of FIG. 4.

Advantageously, the present invention provides a unique marking scheme for each individual film print (which may comprise conventional film prints in 35 mm or other size formats, or digital cinema film, video coded files, etc.) in a way that is controllable and customizable as to the size, number and types of markings both within individual frames, as well as throughout the entire film itself. Thus, each film print is rendered individually identifiable in an efficient way that is robust and durable so as to remain identifiable and thus traceable despite pirating processes.

Having described preferred embodiments for a method and system for marking, coding and tracking a film element (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as outlined by the appended claims. While the forgoing is directed to various embodiments of the present invention, other and further embodiments of the invention may be devised without departing from the basic scope thereof. As such, the appropriate scope of the invention is to be determined according to the claims, which follow.

The invention claimed is:

1. A method for marking a film print, comprising:
   superimposing said film print on a grid for determining possible marking locations;
   determining locations for applying at least one mark to at least one frame of said film print, the optimal locations for said at least one mark being selected from the possible marking locations; and coding said film print by selectively applying marks.

2. The method of claim 1, wherein said marks are selectively and uniquely applied during each replication of said film print such that each replication of said film print comprises a unique code.

3. The method of claim 2, wherein said unique code functions as a serial number for said each replication of said film print.

4. The method of claim 1, wherein said grid comprises zones only slightly larger in size than said marks for increasing a precision for reproducing marking locations.

5. The method of claim 1, wherein said marks are applied such that the marks are inconspicuous in said film print.

6. The method of claim 1, wherein said coding includes at least one of a location, size, shape, color, intensity and orientation of said selectively applied marks.

7. The method of claim 1, wherein said grid comprises a plurality of grid squares with identification axes, each of said grid squares including a marking.

8. The method of claim 1, wherein the step of determining possible marking locations, comprises:

determining the position of the grid relative to the film print;

determining the location of a marking in each graduation of the grid relative to the film print; and selecting locations for placement of a mark in said film print by selecting mark locations that do not hinder said film print.

9. The method of claim 1, wherein said film print is superimposed with said graduated grid on a frame by frame basis.

10. The method of claim 1, further comprising examining an unauthorized film print copy to determine information regarding film markings for identifying a source film print from which said unauthorized film print copy was made.

11. The method of claim 1, further comprising scanning said film print for providing a computer-readable form of said film print.

12. A system for marking a film print comprising:

a prescreening device configured to superimpose said film print with a grid for determining possible marking locations;

a marking device configured to determine optimal locations for applying at least one mark to at least one frame of said film print, the optimal locations for said at least one mark being selected from the possible marking locations; and a coding device configured to uniquely code said film print by selectively applying marks and by using information regarding the selectively applied marks.

13. The system of claim 12, further comprising a scanning device for converting said film print to a computer-readable form.

14. The system of claim 12, further comprising a storage device for storing said unique code and associated film marking information.

15. The system of claim 14, wherein said storage device further stores a copy of at least one frame of said film print.

16. The system of claim 15, wherein the copy of said at least one frame of said film print is used for later comparison with a suspected unauthorized copy of said film print or to correct a respective portion of a film print.

17. The system of claim 14, wherein said storage device further stores information regarding to where a replication of said marked and coded film print is sent.

18. The system of claim 12, further comprising a replication device for replicating said film print.

19. The system of claim 18, wherein each film print replication comprises a unique code.

20. The system of claim 12, wherein said information regarding the selectively applied marks comprises at least one of a location, size, shape, color, intensity and orientation of the selectively applied marks.

* * * * *